United States Patent [19]

Watanabe et al.

[11] 4,375,517

[45] Mar. 1, 1983

[54] SINTERED CUBIC BORON NITRIDE AND PROCESS FOR PRODUCING THE SAME

[75] Inventors: Masakazu Watanabe; Akiyasu Okuno; Isamu Fukuura; Yasushi Matsuo, all of Aichi, Japan

[73] Assignee: NGK Spark Plug Co., Ltd., Nagoya, Japan

[21] Appl. No.: 279,141

[22] Filed: Jun. 30, 1981

Related U.S. Application Data

[63] Continuation-in-part of Ser. No. 112,052, Jan. 14, 1980, abandoned.

[30] Foreign Application Priority Data

Jan. 13, 1979 [JP] Japan .................................. 54-3323

[51] Int. Cl.³ ..................... C04B 35/56; C04B 35/58
[52] U.S. Cl. ...................................... 501/87; 51/307;
51/309; 264/65; 501/93; 501/96
[58] Field of Search .................. 51/307, 309; 264/65;
501/96, 87, 91, 92, 93

[56] References Cited

U.S. PATENT DOCUMENTS 2,044,853  6/1936  Laise .
2,888,355  5/1959  Taylor .
3,752,655  8/1973  Ramquist .
3,852,078  12/1974 Wakatsuki et al. .
4,046,517  9/1977  Soga .
4,186,022  1/1980  Ordanizn et al. .

Primary Examiner—Mark Bell
Attorney, Agent, or Firm—Sughrue, Mion, Zinn, Macpeak & Seas

[57]  ABSTRACT

Sintered cubic boron nitride consisting of 80 to 20% by volume of the following component (a), with the balance being essentially the following component (b), and a process for producing such nitride are disclosed:

(a) cubic boron nitride;
(b) a cermet containing the following sub-components (1), (2) and (3):
(1) TiC and/or TiC-TiN, part of which may be replaced by a carbide, a nitride, a boride and/or a silicide of a transition metal of the group IVa, Va and VIa of the Periodic Table;
(2) Fe, Co and/or Ni; and
(3) Mo and/or Mo$_2$C.

5 Claims, 2 Drawing Figures

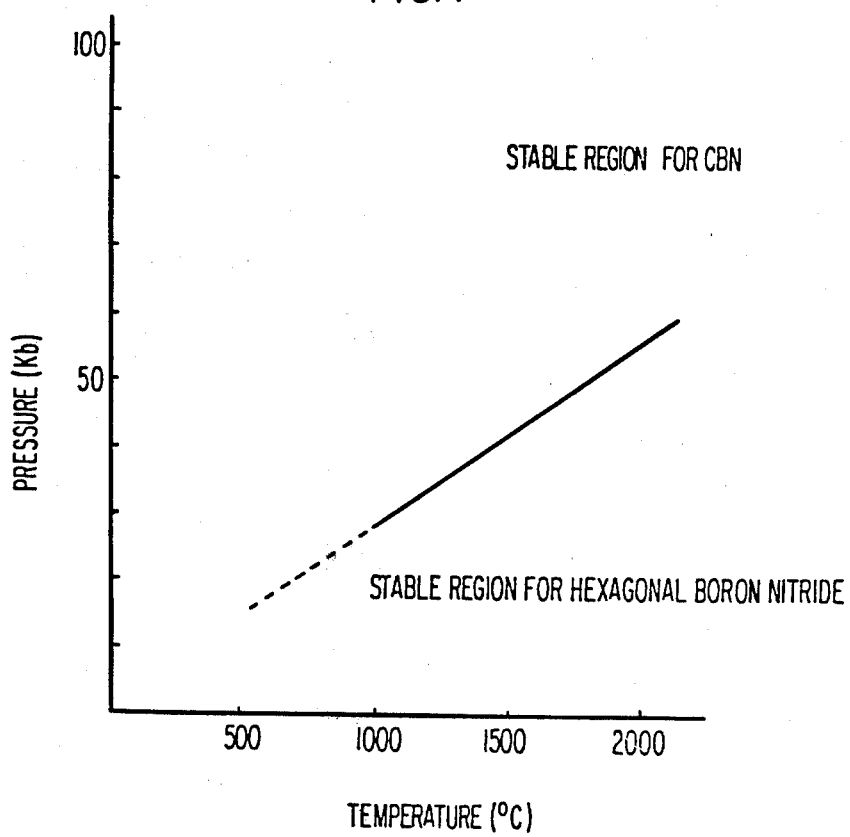

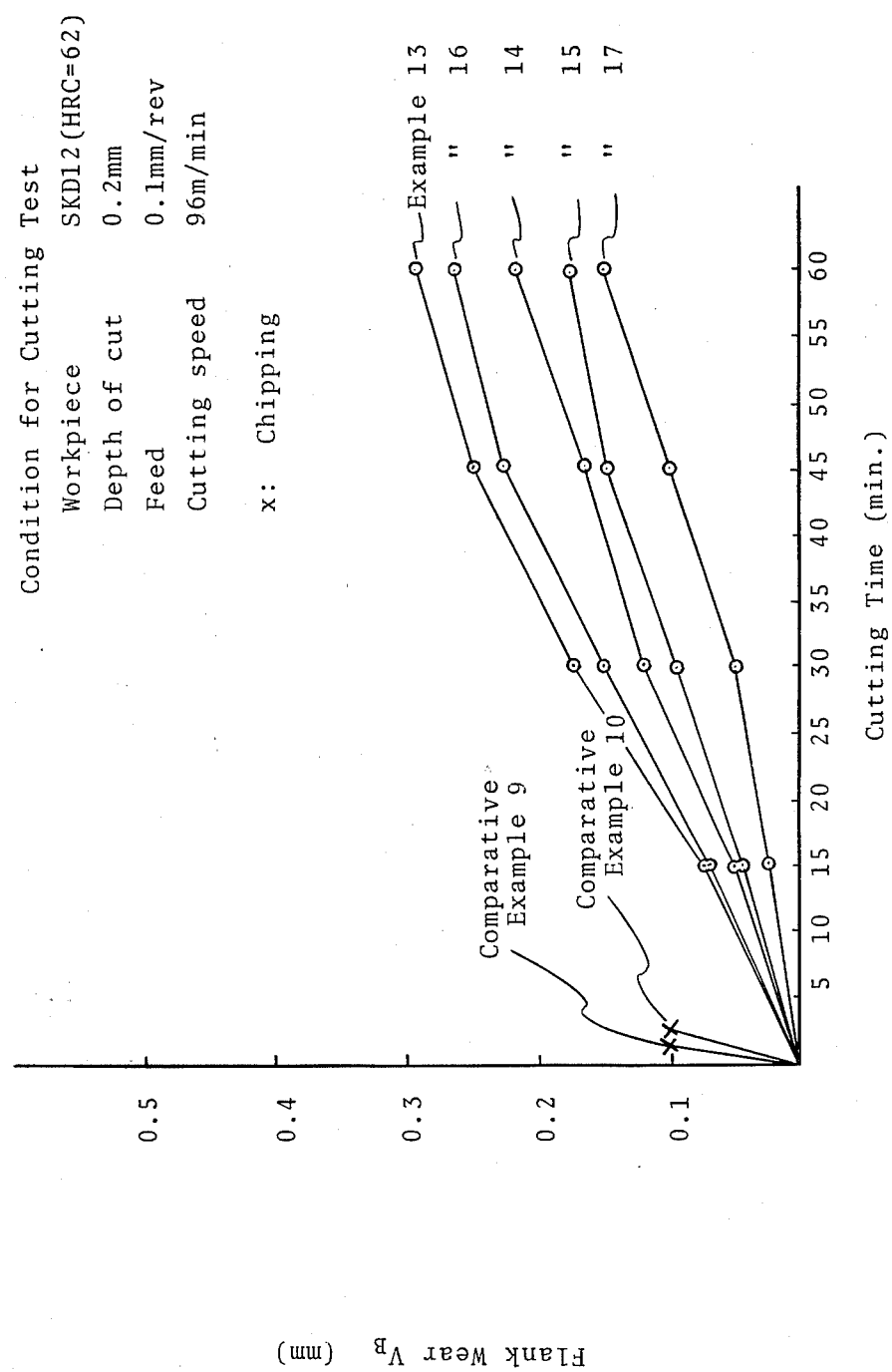

SINTERED CUBIC BORON NITRIDE AND PROCESS FOR PRODUCING THE SAME

This is a continuation-in-part of application Ser. No. 112,052 filed Jan. 14, 1980, now abandoned.

BACKGROUND OF THE INVENTION

1. Field of the Invention

This invention relates to a novel sintered high-density cubic boron nitride and a process for producing the same.

2. Description of the Prior Art

Sintered cubic boron nitride (hereunder referred to as CBN) has excellent physical properties that suggest its potential use in applications such as a cutting tool, a drawing-die, a grinding wheel, an IC heat sink and a high-frequency semiconductor. However, it is almost impossible to sinter cubic boron nitride thoroughly and for this reason metal or metal substitutes have been used as a binder for the sintered CBN. The type of binder and its content greatly affects the performance of the sintered CBN and the sintering conditions. For example, sintered CBN using cobalt or the like as the binder has a binding phase that comprises a brittle intermetallic compound and is deleterious to the performance of the sintered body. Sintered CBN using heat-resistant and tough ceramics such as TiN and AlN is not free from the defect of being brittle.

Therefore, various efforts have been directed to eliminating the defects of conventional sintered CBN. Since CBN remains stable under high-temperature and pressure conditions as shown in the phase diagram of FIG. 1, it must be sintered in such a stable region. However, experiments conducted by the inventors have shown even when CBN is sintered at 65 Kb and 1,750° C. using only a ceramic binder such as TiN or TiN-AlN its density ratio increases to just about 98% and cracks developed in the sintered body. A binder comprising TiN-Si provides a higher density ratio but the resulting sintered compact has cracks in it. (The term "density ratio" is the ratio of the density of the sintered product actually obtained to the density calculated from the theoretical density of each component in the composition). Such phenomena could be explained by the low sinterability of the ceramic that forms the binding phase and insufficient affinity of CBN for the binding phase. Thinking that the improvement of these points may result in the ability to produce a good sintered body under less severe conditions, the inventors have found that in the presence of a specific cermet, a sintered CBN having excellent properties can be obtained under pressures lower than those conventionally used without transformation to hexagonal boron nitride.

SUMMARY OF THE INVENTION

The essence of this invention is a sintered CBN consisting of 80 to 20% by volume of the following component (a) and the balance being essentially the following component (b), and a process for producing such sintered CBN:

(a) CBN;
(b) a cermet containing the following sub-components (1), (2) and (3):
 (1) TiC and/or TiC-TiN, part of which may be replaced by a carbide, a nitride, a boride and/or a silicide of a transition metal of the group IVa, Va and VIa of the Periodic Table;
 (2) Fe, Co and/or Ni; and
 (3) Mo and/or Mo$_2$C.

BRIEF DESCRIPTION OF THE DRAWING

The FIG. 1 is a phase diagram of cubic and hexagonal boron nitrides as a function of pressure and temperature and shows the stable region for each type.

The FIG. 2 is a graph for illustrating results obtained from Examples 13 to 17 and Comparative Examples 9 and 10.

DETAILED DESCRIPTION OF THE INVENTION

It is essential for the sintered CBN of this invention that it contain 80 to 20% by volume of CBN as component (a). If the content of cermet as component (b) is less than 20% by volume, the sinterability of CBN is not adequately improved. If the content of CBN is less than 20% by volume, the excellent physical properties of CBN are not fully introduced into the sintered body. In the sintered body of this invention, component (b) preferably has a continuous structure. The term "continuous structure" used herein means a structure which is three-dimensionally continuous but is not isolated.

Typically a cubic boron nitride (CBN) has the following properties:

| | |
|---|---|
| Specific Gravity | 3.48 |
| Young's Modulus ($\times 10^4$ kg/mm$^2$) | 7.1 |
| Hardness (kg/mm$^2$) | 4500 |
| Thermal Conductivity (cal/cm sec. °C.) | 3.1 |
| Thermal Expansion Coefficient ($\times 10^{-6}$/°C.) | 4.7 |

The sintered body of this invention contains a cermet as component (b) which comprises the components (1), (2) and (3) stated above.

Sub-component (1) of component (b) of the cermet used in this invention serves as the binder for CBN, sub-component (2) not only increases the strength of the bond between TiCN particles but it serves as a hydraulic medium, thus realizing easy sintering and producing a sintered body free from any internal deformation, and sub-component (3) improves the wettability of TiCN particles and iron family elements and eliminates free carbon. The three sub-components work together to improve the sinterability of CBN.

The type of cermet suitable for use as a binder is such that it permits through sintering of CBN without reducing the high hardness, high heat resistance, high thermal conductivity and other characteristics of CBN which are required in the sintered body. For instance, if an Al$_2$O$_3$-Cr cermet is used as the binder, a solid solution of Cr in Al$_2$O$_3$ is formed during sintering and the sinterability of CBN is not improved. A binder comprising Al$_2$O$_3$ or Al$_2$(Cr)O$_3$ deteriorates the thermal conductivity of a sintered body, thus failing to provide one of the characteristic features of CBN. Like a TiCN-based cermet, a WC-Co or WC-Ni super hard alloy improves the sinterability of CBN, but is defective in that it is oxidized at high temperatures with relative ease.

The preferable content of sub-component (1) is about 65 to 92 wt %, that of sub-component (2) is about 5 to 15 wt %, and that of sub-component (3) is about 3 to 20 wt %.

Part of TiC and/or TiC-TiN as component (1) may be replaced with up to 10% by weight of a carbide, a nitride, a boride or a silicide of W, Ta, Hf, Zr, Ti and other transition metals of the group IVa, Va and VIa of the Periodic Table, and such carbide, nitride, boride and silicide may form a mixture or a mutual solid solution.

The cermet may optionally contain a trace amount (at least 0.1 wt % but generally not more than about 5 wt %) of Al, Al compound and/or Si as a sub-component (4) which increases the stability of CBN to advantage. Sub-component (4) is a known catalyst for stabilizing CBN. (R. H. Bentorf, *Chemical Physics*, 26, 956 (1957), Japanese Patent application (OPI) Nos. 17503/1973 and 77811/1978). When sintered under less severe sintering conditions, CBN may transform to the hexagonal form depending upon the type and amount of the component it is blended with. Therefore, a trace amount of sub-component (4) is added to inhibit such undesired transformation, although its addition does not directly result in improved sinterability of CBN.

Production of the sintered body according to this invention comprises (1) blending and compacting CBN powder with the above specified cermet in predetermined proportions, (2) heating in vacuum the compact set into the metal container to remove the organic binder and seal it into the container and (3) feeding the metal container with the compact into a belt-type or girdle-type high pressure apparatus where it is sintered at a pressure of at least 45 Kb and at a temperature of at least 1,350° C.

Since this invention uses a special cermet as the binder, the blend need not necessarily be sintered within the stable region of CBN indicated in the FIG. 1, and a satisfactory sintered body is provided even if sintering is performed under the above defined conditions which are less severe than those for the stable region. But as the pressure decreases from 45 Kb, the sinterability of CBN gradually decreases, and if the pressure goes beyond the bounds of the stable region of CBN, CBN transforms to the hexagonal form, failing to produce a sintered body. The sinterability of CBN also decreases if the temperature is lower than 1,350° C. Conditions severer than the above defined range may be employed if they are within the stable region of CBN, but since the composition for sintering as defined in this invention can provide an adequately satisfactory sintered CBN by means of sintering at 45 Kb and 1,350° C., sintering conditions need not be any more severe. In addition, severe conditions do not serve a practical purpose because the higher the temperature and the pressure, the faster is the high pressure apparatus worn or damaged.

In the practice of the process of this invention, a graphite cylinder is ordinarily used as an element to heat the CBN powder blend, and the cylinder is packed with an insulating material such as talc or NaCl that surrounds the container of the blend. The graphite heating element is surrounded by pyroferrite or other suitable hydraulic medium.

According to this invention, a cermet of the specified composition is added to CBN to improve its sinterability and provide a crack-free sintered compact of good quality. This result is believed due to the fact that: (1) the cermet itself has the ability to form a sintered body without application of pressure; (2) the cermet is tougher than a sintered ceramic; and (3) the cermet easily undergoes intergranular plastic deformation to mitigate any internal strain built up.

Also, according to this invention, a dense sintered product can be obtained at a pressure of 45 Kb which is lower than that conventionally required. This addes greatly to the industrial value of the invention since operating pressures higher than 50 Kb cause a sudden reduction in the service life of the mold of the high pressure apparatus that is made of a super hard alloy.

This invention is now described in the following examples which are given here for illustrative purposes only and are by no means intended to limit this invention. It should therefore be understood that various modifications are possible without departing from the scope and spirit of the invention.

EXAMPLES 1 TO 7

A mixture comprising 80% by volume of CBN powder (average particle size: $4\mu$) and 20% by volume of cermet powder having the compositions set forth in the table 1 below was blended with 5 wt % of camphor under wet conditions and dried. The dried powder was granulated, press molded at a pressure of 3 ton/cm$^2$, and set in a metal container. The container was placed in a vacuum ($10^{-3}$ Torr) at 500° C. for a period of 1 hour during which the resin mold was removed. Subsequently, the compact was enclosed with the container in vacuum as the temperature was elevated to 1,000° C. The thus sealed metal container was set in a belt-type high pressure apparatus where the compact was sintered at 50 Kb and 1,550° C. for a period of 15 minutes. Each of the sintered bodies was checked for its density ratio and the presence of cracks. The results are set forth in the table 1 below.

COMPARATIVE EXAMPLES 1 TO 6

The procedure of Examples 1 to 7 was repeated except that the cermet was replaced with conventional binders. The results with the controls are also shown in table 1 below.

As will be clear from the table 1, the sintered CBN of this invention was free from cracks and had a density ratio substantially equal to 100% although it was obtained by sintering under less severe conditions than employed in the conventional technique.

TABLE 1

| | CBN Content (Vol. %) | Binder Composition (Wt. %) | Binder Content (Vol. %) | Sintering Conditions Pressure (Kb) | Temp. (°C.) | Density Ratio (%) | Cracks |
|---|---|---|---|---|---|---|---|
| Examples | | | | | | | |
| 1 | 80 | Cermet A TiC-TiN:80 (TiC/TiN = 2/1) Ni:10 | 20 | 50 | 1,550 | 99.8 | Absent |
| 2 | 60 | | 40 | 50 | 1,550 | 99.9 | Absent |
| 3 | 40 | Mo:10 | 60 | 50 | 1,550 | 99.9 | Absent |
| 4 | 80 | Cermet B TiC:80 Ni:10 | 20 | 50 | 1,550 | 99.7 | Absent |

TABLE 1-continued

| | CBN Content (Vol. %) | Binder Composition (Wt. %) | Binder Content (Vol. %) | Sintering Conditions Pressure (Kb) | Sintering Conditions Temp. (°C.) | Density Ratio (%) | Cracks |
|---|---|---|---|---|---|---|---|
| 5 | 80 | Mo:10 Cermet C | 20 | 50 | 1,550 | 99.8 | Absent |
| 6 | 80 | TiC:80 Ni:10 Mo$_2$C:10 Cermet D | 20 | 50 | 1,550 | 99.3 | Absent |
| 7 | 80 | 10 wt % of TiC-TiN replaced by TaC Cermet E | 20 | 50 | 1,550 | 99.7 | Absent |
| Comparative Examples | | Cermet A + 0.5 Al | | | | | |
| 1 | 80 | TiN | 20 | 65 | 1,750 | 97.5 | Present |
| 2 | 80 | TiN-5Si | 20 | 55 | 1,750 | 99.5 | Present |
| 3 | 80 | " | 20 | 55 | 1,550 | 98.2 | Present |
| 4 | 80 | TiN-20AlN | 20 | 55 | 1,550 | 98.3 | Present |
| 5 | 80 | Co | 20 | 55 | 1,550 | 99.8 | Absent |
| 6 | 80 | Cermet F WC-10 Co | 20 | 50 | 1,550 | 99.8 | Absent |

EXAMPLES 8 TO 12

A cermet powder having the compositions set forth in the table 2 below was blended with 5 wt % of camphor under wet conditions and dried. The dried powder was granulated, press molded at a pressure of 1.5 ton/cm$^2$. The compact was placed in a vacuum ($10^{-3}$ Torr) at 550° C. for a period of 1 hour during which camphor was removed. Subsequently, the compact was sintered in vacuum at 1,350° C. for a period of 1 hour.

The bend strength and vickers hardness of the sintered bodies were measured. The results obtained are set forth in the table 2 below.

COMPARATIVE EXAMPLES 7 AND 8

The procedure of Examples 8 to 12 was repeated except that the binder was replaced with a binder having the composition outside the scope of the present invention. The results obtained are shown in the table 2 below.

As will be clear from the table 2, when the cermet powder does not contain even one of the subcomponents (1), (2) and (3), the cermet powder was not sintered sufficiently.

TABLE 2

| | Binder Composition | | | Bend Strength (Kg/mm$^2$) | Vickers Hardness |
|---|---|---|---|---|---|
| | TiC/TiN = 2/1 | Ni | Mo | | |
| Examples | | | | | |
| 8 | 92 | 5 | 3 | 115 | 1710 |
| 9 | 82 | 15 | 3 | 130 | 1600 |
| 10 | 65 | 15 | 20 | 150 | 1550 |
| 11 | 75 | 5 | 20 | 143 | 1680 |
| 12 | 80 | 10 | 10 | 154 | 1640 |
| Comparative Examples | | | | | |
| 7 | 95 | 5 | 0 | 45 | — |
| 8 | 95 | 0 | 5 | 40 | — |

EXAMPLES 13 TO 17

A mixture comprising 80% by volume of CBN powder (average particle size: 4μ) and 20% by volume of cermet powder having the same composition as that used in each of Examples 8 to 12 was blended with 5 wt % of camphor under wet conditions to prepare a mixture for Examples 13 to 17 and dried. The dried powder was granulated, press molded at a pressure of 3 ton/cm$^2$, and set in a metal container. The container was placed in a vacuum ($10^{-3}$ Torr) at 500° C. for a period of 1 hour during which campher was removed. Subsequently, the compact was enclosed with the container in vacuum as the temperature was elevated to 1,000° C. The thus sealed metal container was set in a belt-type high pressure apparatus where the compact was sintered at 50 Kb and 1,550° C. for a period of 15 minutes. Each of the sintered bodies was evaluated by the cutting test. The results obtained are set forth in the FIG. 2 below.

COMPARATIVE EXAMPLES 9 AND 10

The procedure of Examples 13 to 17 was repeated except that the cermet was replaced with a cermet having the same composition as that of Comparative Example 7 or 8. The results obtained are set forth in the FIG. 2 below.

As will be clear from the FIG. 2, in case where the cermets having the same compositions as those of Comparative Examples 7 and 8 were employed as binder for the sintered cubic boron nitride, these bond forces were insufficient and the chipping occurred.

These differences in performance between sintered cermets containing the subcomponents (1), (2) and (3) and cermets lacking in one of subcomponents and furthermore between sintered cubic boron nitrides consisting of cubic boron nitride and cermets containing the subcomponents (1), (2) and (3) and sintered cubic boron nitrides consisting of cubic boron nitride and cermets lacking in one of subcomponents are unexpectable from the teachings of U.S. Pat. No. 3,852,078 to Wakatsuki et al.

Further, it is quite difficult to expect that cubic boron nitrides provide a good sintering ability only in case of employing cermets having composition of Ti(Cn)—Fe group—Mo or Mo$_2$C system, that is, of cermets containing subcomponents (1), (2) and (3) of the present invention as a binder from the description of "the mass further contains at least one metal selected from the group consisting of Ti, Zr, Hf, V, Nb, Ta, Cr, Mo, W, Mn, Fe and Si" at Claim 3 of Column 14 of U.S. Pat. No. 3,852,078 to Wakatsuki et al.

While the invention has been described in detail and with reference to specific embodiments thereof, it will be apparent to one skilled in the art that various changes and modifications can be made therein without departing from the spirit and scope thereof.

What is claimed is:

1. A sintered cubic boron nitride consisting of 80 to 20% by volume of the following component (a), with the balance being essentially the following component (b):
   (a) cubic boron nitride;
   (b) a cermet containing the following sub-components (1), (2) and (3):
   (1) about 65 to 92 wt % TiC and/or TiC-TiN, part of which may be replaced with up to 10 wt % of a carbide, a nitride, a boride and/or a silicate of a transition metal of the group IVa, Va and VIa of the Periodic Table;
   (2) about 5 to 15 wt % Fe, Co and/or Ni; and
   (3) about 3 to 20 wt % Mo and/or Mo$_2$C.

2. The sintered cubic boron nitride of claim 1, wherein the component (b) has a continuous structure in the sintered body.

3. The sintered cubic boron nitride consisting of 80 to 20% by volume of the following component (a), with the balance being essentially the following component (b):
   (a) cubic boron nitride;
   (b) a cermet containing the following sub-components (1), (2), (3) and (4):
   (1) about 65 to 92 wt % TiC and/or TiC-TiN, part of which may be replaced with up to 10 wt % of a carbide, a nitride, a boride and/or a silicide of a transition metal of the group IVa, Va, and VIa of the Periodic Table;
   (2) about 5 to 15 wt % Fe, Co and/or Ni;
   (3) about 3 to 20 wt % Mo and/or Mo$_2$C; and
   (4) about 0.1 to 5 wt % Al, Al compound and/or Si.

4. The sintered cubic boron nitride of claims 1 or 3, wherein said TiC and/or TiC-TiN is replaced by a carbide, a nitride, a boride or a silicide of W, Ta, Hf, Zr, or Ti.

5. A process for producing sintered cubic boron nitride consisting of 80 to 20% by volume of the following component (a), with the balance being essentially the following component (b), said process comprising mixing a powder of the component (a) with that of the component (b), and sintering a compact prepared by pressing in a die in a high pressure apparatus at a pressure of at least 45 Kb and a temperature of at least 1,350° C.:
   (a) cubic boron nitride;
   (b) a cermet containing the following sub-components (1), (2) and (3):
   (1) about 65 to 92 wt % TiC and or TiC-TiN, part of which may be replaced with up to 10 wt % of a carbide, a nitride, a boride and/or a silicide of a transition metal of the group IVa, Va and VIa of the Periodic Table;
   (2) about 5 to 15 wt % Fe, Co and/or Ni; and
   (3) about 3 to 20 wt % Mo and/or Mo$_2$C.

* * * * *